(12) United States Patent
Chandler et al.

(10) Patent No.: US 7,664,849 B1
(45) Date of Patent: Feb. 16, 2010

(54) METHOD AND APPARATUS FOR CONTROLLING FINITE IMPULSE RESPONSES USING ALERT DEFINITIONS IN POLICY-BASED AUTOMATION

(75) Inventors: Christopher James Elphinstone Chandler, Boston, MA (US); Guy Barry Owen Bunker, Buckinghamshire (GB)

(73) Assignee: Symantec Operating Corporation, Mountain View, CA (US)

( * ) Notice: Subject to any disclaimer, the term of this patent is extended or adjusted under 35 U.S.C. 154(b) by 365 days.

(21) Appl. No.: 11/180,886

(22) Filed: Jul. 13, 2005

Related U.S. Application Data

(60) Provisional application No. 60/695,466, filed on Jun. 30, 2005.

(51) Int. Cl.
  *G06F 15/173* (2006.01)
  *G06F 11/00* (2006.01)
(52) U.S. Cl. ......................... 709/224; 714/47
(58) Field of Classification Search ................ 709/223
  See application file for complete search history.

(56) References Cited

U.S. PATENT DOCUMENTS

| | | | | |
|---|---|---|---|---|
| 5,790,024 | A * | 8/1998 | Ripingill et al. | 340/565 |
| 5,847,658 | A * | 12/1998 | Irie et al. | 340/683 |
| 6,196,974 | B1 * | 3/2001 | Miwa | 600/490 |
| 6,570,592 | B1 | 5/2003 | Sajdak et al. | |
| 6,624,829 | B1 | 9/2003 | Beck et al. | |
| 6,629,266 | B1 * | 9/2003 | Harper et al. | 714/38 |
| 6,726,632 | B2 * | 4/2004 | Tampo et al. | 600/481 |
| 6,937,941 | B2 * | 8/2005 | Hala et al. | 702/33 |
| 7,149,738 | B2 | 12/2006 | Kumar et al. | |
| 7,224,363 | B2 | 5/2007 | Kamiyama | |
| 7,289,453 | B2 * | 10/2007 | Riedel et al. | 370/252 |
| 7,515,044 | B2 * | 4/2009 | Welch et al. | 340/539.12 |
| 2003/0046396 | A1 * | 3/2003 | Richter et al. | 709/226 |
| 2003/0083580 | A1 * | 5/2003 | Tampo et al. | 600/490 |
| 2003/0195934 | A1 * | 10/2003 | Peterson et al. | 709/206 |
| 2005/0015624 | A1 * | 1/2005 | Ginter et al. | 713/201 |

(Continued)

OTHER PUBLICATIONS

Charlotte Brooks, Michel Baus, Michael Benanti, Ivo Gomilsek, Urs Moder "IBM Tivoli Storage Area Network Manager: A Practical Introduction", Sep. 2003, IBM redbooks, pp. 11, 49, 188,222, 223, 227, 233, 265, 354.*

*Primary Examiner*—Neveen Abel Jalil
*Assistant Examiner*—Tarek Chbouki
(74) *Attorney, Agent, or Firm*—Robert C. Kowert; Meyertons, Hood, Kivlin, Kowert & Goetzel, P.C.

(57) ABSTRACT

Method and apparatus for the control of finite impulse responses for alerting in policy-based automation. Embodiments of the alert definition mechanism may provide a graphical user interface (GUI) that assists the user in generating complex alert definitions by graphically displaying the signal waveform and providing graphical user interface elements according to a GUI paradigm for manipulating various parameters, such as thresholds, edges, rates, and sustain and repeat periods, to define the alert or alerts. Embodiments of the alert definition mechanism may be used, for example, to assist the user in configuring the policies used in a policy-based automation system. This graphical shaping paradigm may be used to graphically, rather than textually, define the various parameters for alert definitions for relatively simple to complex alert definitions. This graphical approach may be more intuitive to the user than conventional, text-based alert definition mechanisms.

20 Claims, 8 Drawing Sheets

U.S. PATENT DOCUMENTS

2005/0114044 A1*  5/2005  Hala et al. .................... 702/33
2005/0193115 A1*  9/2005  Chellis et al. ............... 709/226
2005/0227625 A1* 10/2005  Diener ..................... 455/67.7
2006/0031476 A1*  2/2006  Mathes et al. ............... 709/224
2006/0161457 A1*  7/2006  Rapaport et al. ............... 705/2
2007/0033447 A1*  2/2007  Fujibayashi .................. 714/47

* cited by examiner

METHOD AND APPARATUS FOR CONTROLLING FINITE IMPULSE RESPONSES USING ALERT DEFINITIONS IN POLICY-BASED AUTOMATION

PRIORITY INFORMATION

This application claims benefit of priority to U.S. Provisional Patent Application No. 60/695,466 filed Jun. 30, 2005 titled "Method and Apparatus for Controlling Finite Impulse Responses Using Alert Definitions in Policy-Based Automation" by inventors Christopher James Elphinstone Chandler and Guy Barry Owen Bunker, which is incorporated by reference herein in its entirety.

BACKGROUND OF THE INVENTION

1. Field of the Invention

This invention is related to the field of computer systems and, more particularly, to policy-based automation in computer systems.

2. Description of the Related Art

In Information Technology (IT), alert management is an important component of many different applications, for example in the areas of policy-based automation and utility computing. Alerts may be raised against thresholds for many reasons across the entire spectrum of IT applications. When it is decided that an application should detect and manage alerts, it is typical to start with something simple, such as determining whether a threshold for a metric being measured in a computing environment, network, or system being managed and/or monitored by the application is crossed, and allowing the user to set a severity level to warn that the threshold has been crossed. Conventionally, a simple "Wizard" or dialog box user interface with text entry user interface elements, and possibly other user interface elements such as menus and list boxes, have been used to define such relatively simple thresholds for policy-based automation and utility computing applications.

In policy-based automation and utility computing environments, there is often a requirement for multiple severities for different thresholds. For example, crossing a first threshold may generate an informational message; crossing a second threshold may generate a warning; and crossing a third threshold may generate a critical report. It is comparatively easy to create a user interface to do this. Conventional "Wizard" or dialog box user interfaces are generally sufficient for defining these slightly more complex thresholds.

However, in many policy-based automation and utility computing environments, there may be even more complex alert threshold definitions with many individual parameters. These environments may require a more complex solution for many alerts, for example for an alert to be reset automatically when the value drops below a first threshold, or for additional constraints to be satisfied before an alert can be trusted as significant. Additionally, there may be a time element for alerts; for example, an alert may be triggered if a threshold has been crossed for a certain amount of time, or if a value for a signal is sustained for a certain amount of time. Thus, in contrast to relatively simple alert definitions, many alert definitions in real-world applications may have many parameters, which may or may not be capable of being defaulted.

For many such complex alerts, there may be such a complexity of various parameters that it is hard for the user to keep track of them all through a conventional Wizard-based interface. The complexity of a conventional "Wizard" or dialog box user interface for alerts with a large number of parameters may be difficult to handle, even for an experienced user. This difficulty may be compounded by the typical user scenario, which is to start simply and add tweaks as more is learned about the environment. Further, the complexity of the user interface may grow as more features are added. Therefore, it may become difficult for the user to understand how the individual parameters are used and how one parameter may affect other parameters, and the user interface may have to be relearned with each release of the product. In addition, the Wizard-based approach is not conducive to learning how to do something (i.e., to configure and manage one alert) and then capitalizing on that knowledge to solve a different problem (i.e., to configure and manage a different alert). In other words, two different "Wizard" interfaces for managing two different complex alerts, even in the same policy-based automation/utility computing environment, may be so different that learning how to use one of the Wizard interfaces may not significantly lessen the learning curve for learning how to use the other Wizard interface.

Storage Area Network (SAN)

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and full-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

SUMMARY

Embodiments of a method and apparatus for the control (e.g. by a human user) of finite impulse responses using alerts in policy-based automation are described. Embodiments may provide an alert definition mechanism that presents a graphical user interface (GUI) with pictorial control user interface elements for configuring the conditions under which an alert is generated in response to a finite impulse, for example, when a threshold is crossed in an alert management system, or more specifically in a policy-based automation system. Embodiments of the alert definition mechanism may be used in any utility computing or policy-based automation system where there is a need for user-defined alarm conditions. Embodiments of the alert definition mechanism provide a graphical user interface that assists the user in generating complex alert definitions by graphically displaying the signal waveform and providing graphical user interface elements for manipulating various parameters to define the alert.

Embodiments of the alert definition mechanism may be used, for example, to assist the user in configuring the policies used in a policy-based automation system. In one embodiment, the alert conditions defined by the user through interaction with the alert definition mechanism GUI may be associated with one or more response actions in policy definitions in the policy-based automation system. The policy definitions may then be implemented and applied by a policy engine of the policy-based automation system to detect alert conditions in signals collected from monitored objects, and the actions specified in the policy definitions may be initiated upon detection of an alert condition in accordance with the alert definitions specified in the policy definitions. An exemplary policy-based automation system in which embodiments may be applied is a SAN management system.

Embodiments of the alert definition mechanism may provide a graphical user interface that allows the user to decide and specify if and when a system is to respond to an event (e.g., an impulse, or spike) in a signal waveform collected from some monitored object. Embodiments may allow the user to graphically define which part of an impulse in a signal waveform, and what series of changes the signal waveform must go through, to trigger an alert and a corresponding response. The graphical user interface provided by embodiments of the alert definition mechanism allow the user to graphically (and visually) define exactly if and when on the signal waveform the system is going to respond with some appropriate action. Note that embodiments may be used to generate different alert definitions for different policies that correspond to different events on an impulse in a signal waveform at different times and locations on the signal waveform.

In embodiments, the user interface elements of the alert definition mechanism GUI may graphically present the envelope of a signal waveform that is to be monitored, and may provide one or more handles, dials, sliders, textual or numeric entry boxes, buttons, popup menus, and other graphical user interface elements to modify the shape of the signal and the alert conditions and parameters. In addition, the alert definition mechanism GUI may provide one or more user interface elements (e.g., popup menus) to modify the GUI itself (e.g., by adding or removing user interface elements that are used to control the shape of the signal waveform or other parameters, such as thresholds).

This graphical shaping paradigm may be used to graphically, rather than textually, define the various parameters for alert definitions in the full range from simple to complex alert definitions. This graphical approach may be more intuitive to the user responsible for defining and managing alerts in policy-based automation environments than conventional, text-based "Wizard" alert definition mechanisms. This graphical approach ties the effects of modifications of the parameters together, allowing the user to visualize what the overall response looks like, and to quickly and easily see the effects that modifying one parameter may have on other parameters.

BRIEF DESCRIPTION OF THE DRAWINGS

The following detailed description makes reference to the accompanying drawings, which are now briefly described.

Figure 1:
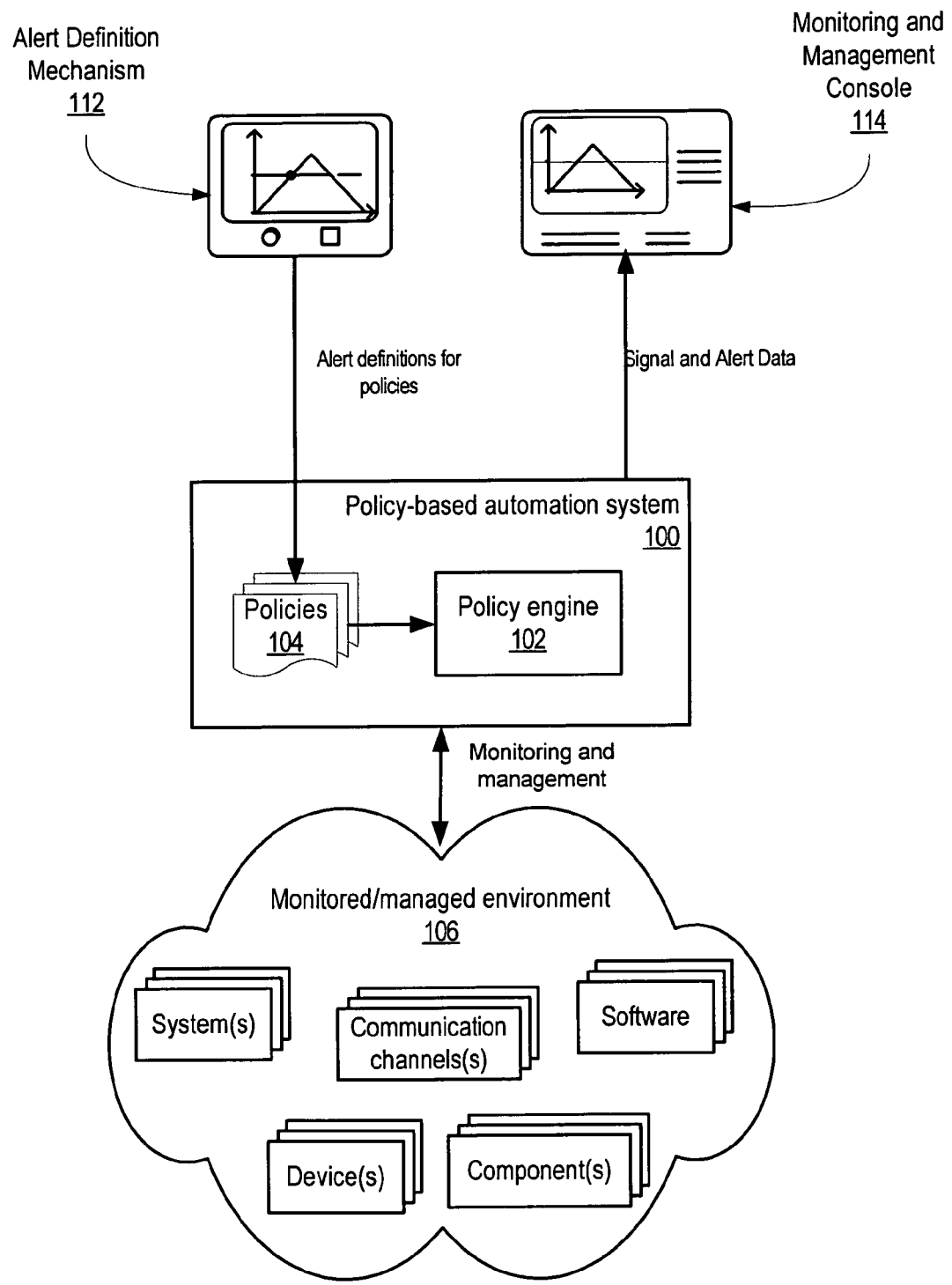
FIG. 1 illustrates an embodiment of a graphical alert definition mechanism implemented in an exemplary policy-based automation system.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for the control (e.g. by a human user) of finite impulse responses using alerts in policy-based automation are described. Embodiments may provide an alert definition mechanism that presents a graphical user interface (GUI) with pictorial control user interface elements for configuring the conditions under which an alert is generated in response to a finite impulse, for example, when a threshold is crossed in an alert management system. Pictorial control interfaces are generally much easier to understand, learn, and use than a complex set of textual user interface elements presented in a "Wizard" interface as is done in conventional alert definition mechanisms.

Alert management is an important component of many different applications for policy-based automation and utility computing. Alerts may be raised against thresholds for many reasons across the entire spectrum of policy-based automation and utility computing. For example, a backup system might monitor tape I/O rate to detect if it has dropped below the streaming rate, or a utility computing management system might need to detect when a service level is no longer in compliance. Other examples may include, but are not limited to, monitoring bandwidth usage and/or throughput in a network environment, monitoring the heat of a CPU fan, and monitoring the amount of disk space in a storage subsystem. A 'simple' decision in these cases typically does not reflect reality, and thus a more complex alert may need to be defined for use in policy-based automation in the real world. Embodiments of the alert definition mechanism as described herein provide a graphical user interface that assists the user in generating such complex alert definitions by graphically displaying the signal waveform and providing graphical control user interface elements for manipulating various alert parameters (represented on the GUI by alert parameter user interface elements) to define the alert.

Embodiments of the alert definition mechanism may be used in any utility computing or policy-based automation system where there is a need for a user interface for defining the automation and detection of changing states. Embodiments of the alert definition mechanism provide a graphical user interface (GUI) paradigm that allows the user to define under what conditions a state change will take place on a signal waveform (potentially generating an alert condition), and when an action will be taken in response to a change of state (e.g., crossing a threshold).

Embodiments of the alert definition mechanism may be used, for example, to assist the user in configuring the policies used in a policy-based automation system. In one embodiment, the alert conditions defined by the user through interaction with the alert definition mechanism GUI may be associated with one or more response actions in policy definitions in the policy-based automation system. The policy definitions may then be implemented and applied by a policy engine of the policy-based automation system to detect alert conditions in signals collected from monitored objects, and the actions specified in the policy definitions may be initiated upon detection of an alert condition in accordance with the alert definitions specified in the policy definitions.

Embodiments of the alert definition mechanism may provide a graphical user interface that allows the user to decide and specify if and when a system is to respond to an event (e.g., an impulse, or spike) in a signal waveform collected from some monitored object. Embodiments may allow the user to graphically define which part of an impulse in a signal waveform, and what series of changes the signal waveform must go through, to trigger an alert and a corresponding response. For example, the user might not want the system to respond to an initial "attack phase" of an impulse in a signal waveform, but only at some point when the signal waveform is coming down (decay phase) from the impulse. The graphical user interface provided by embodiments of the alert definition mechanism allow the user to graphically (and visually) define exactly if and when on the signal waveform the system is going to respond with some appropriate action specified in a policy. Note that embodiments may be used to generate different alert definitions for different policies that correspond to different events on an impulse in a signal waveform at different times and locations on the signal waveform. For example, an alert definition mechanism GUI may be used to generate an alert definition for a threshold on the attack phase of an impulse and a separate alert definition for a different threshold on the decay phase of the impulse.

In embodiments, the alert definition mechanism GUI may graphically (pictorially) present the envelope of a signal (referred to herein as the signal waveform) that is to be monitored, and may provide one or more "drag and drop" handles, dials, sliders, textual or numeric entry boxes, buttons, popup menus, and other graphical control user interface elements to modify the shape of the signal and the alert conditions and parameters (represented on the GUI by alert parameter user interface elements). The handles may allow the user to slide parts of the signal waveform, threshold levels, period edges, etc., or alternatively the user may manipulate the dials or other user interface elements, to modify the signal waveform and/or set the various parameters for the alert(s). In addition, the alert definition mechanism GUI may provide one or more user interface elements (e.g., popup menus) to modify the GUI itself (e.g., by adding or removing user interface elements that are used to control the shape of the signal waveform or other parameters, such as thresholds).

This graphical shaping paradigm may be used to graphically, rather than textually, define the various parameters for alert definitions in the full range from simple alert definitions to complex alert definitions. This graphical approach may be more intuitive to the administrator or other user responsible for defining and managing alerts in policy-based automation environments than conventional, text-based "Wizard" alert definition mechanisms. This graphical approach ties the effects of modifications of the parameters together, allowing the user to visualize what the overall response looks like, and to quickly and easily see the effects that modifying one parameter may have on other parameters. For example, if there is a sharp curve at the front of the signal waveform, the initial alert detection will be rapid, and the graphical interface allows that effect to be visualized. If this were represented as a sequence of numbers in a table, as in the conventional Wizard approach, that effect would not be easy for the user to visualize.

Embodiments of the alert definition mechanism may be used to define the inter-impulse response behavior, as well as the intra-impulse response. For example, the user may not want an alert to be asserted a second time within some period; embodiments of the alert definition mechanism allow the user to visually define this inter-impulse response behavior.

FIG. 1 illustrates an embodiment of the graphical alert definition mechanism implemented in an exemplary policy-based automation system. Policy-based automation system 100 may be a computer-based, policy-driven automated system for monitoring and managing a computing environment 106. Computing environment 106 may be, for example, a computing system or device, a network of systems and/or devices, a storage system (e.g., Network-Addressable Storage (NAS) or Storage Area Network (SAN)), a backup system, or in general any computing environment comprising one or more systems and/or other computing devices, which may or may not be coupled via a wired and/or wireless network, and/or software such as one or more programs, applications, services, drivers, etc. which may operate on various systems or devices in the computing environment 106. Note that components of various systems and devices in computing environment 106 (e.g., processors in a computing system or device) may also be monitored and managed by a policy-based automation mechanism, as well as communications channels between hardware and/or software elements of environment 106. In this document, the term object may be used to refer to any hardware or software element of the computing environment 106 which may be monitored and managed by policy-based automation system 100, and for which alerts definitions (policies 104) may be generated using an embodiment of the alert definition mechanism 112.

Policy-based automation system 100 may include a policy engine 102. The following describes the operations of an exemplary policy engine 102. Policy engine 102 may perform the instructions described in all policies 104 defined using the alert definition mechanism 112. In one embodiment, the policy engine may be a component or process of a policy service component of policy-based automation system 100. In one embodiment, a policy 104 may be based on a particular type of data for a particular object or type of object in environment 106. The policy engine 102 may receive a stream or streams of real-time data collected from one or more objects of environment 106 and compare data values from the stream (s) with the conditions described in its policies 104.

In one embodiment, when an alert condition defined in a particular policy 104 is met, the policy engine may initiate one or more alert response actions which may also be described in the policy 104. Actions which may be performed by policy engine 102 in response to an alert condition may include, but are not limited to, initiating automated responses to the alert condition, visually and/or audibly reporting the alert condition, for example to a monitoring and management console 114, logging and/or printing the alert condition, generating email messages alerting administrators of the alert condition, etc.

In one embodiment, the policy engine 102 may use current data values from the data stream, and may retain the values in a buffer long enough to determine whether an alert threshold according to a policy 104 has been met. For example, a threshold for a network switch in environment 106 may be defined in a policy 104 as something like "switch port utilization greater than eighty percent for two minutes." In this example, the policy engine 102 may monitor the current value of a collected port utilization data stream over a two-minute period. When a threshold condition defined in a policy 104 is met, the policy engine 102 may perform whatever action(s) is prescribed by that policy 104.

Conventionally, alert definitions have been defined using a text-based "Wizard" or dialog user interface as an alert definition mechanism. In embodiments, alert definition mechanism 112 may instead present a graphical user interface (GUI) with one or more pictorial control user interface elements for configuring the conditions under which an alert is generated in response to a finite impulse, for example, when a threshold is crossed for a data stream collected from an object in environment 106 being monitored by policy-based automation system 100. In one embodiment, once the conditions under which an alert is generated are defined using alert definition mechanism 112, the defined alert conditions are stored in a policy 104, which may then be used to control the actions of policy engine 102. Note that alert definition mechanism 112 may also provide one or more textual and/or graphical user interface elements for defining alert response actions to be initiated by policy engine 102 upon detecting an alert condition as defined in a policy 104.

Note that FIG. 1 illustrates alert definition mechanism 112 as a graphical user interface (GUI) that may be presented to an administrator of policy-based automation system 100 on a computer screen or monitor. However, alert definition mechanism 112 may also include one or more software components that may be external to and/or integrated with policy-based automation system 100. In other words, alert definition mechanism 112 may be a stand-alone system or may be integrated in another system such as policy-based automation system 100. The software components of alert definition mechanism may be configured to, for example, present the alert definition mechanism 112 GUI to the user, receive user input to the user interface elements of the GUI, and modify an existing policy 104 or generate a new policy 104 in response to the user input to the user interface elements. This process may include, but is not limited to, translating the user manipulations of the various alert definition mechanism 112 GUI elements into a textual or other digital format used in policies 104. Note that, in one embodiment, the alert definition mechanism 112 GUI may provide an "accept" or "save" user interface element that the user may select to commit a graphically-defined alert definition to a policy 104.

In one embodiment, one or more default alert definitions (e.g., policies 104) may be provided for at least some of the alerts which may be modified as necessary or desired by an administrator via alert definition mechanism 112. In one embodiment, alert definition mechanism 112 may read an existing (default or modified) policy 104 (or, alternatively, some other alert definition mechanism 112 GUI configuration file) to initialize the alert definition mechanism 112 GUI for a particular alert which has been selected to be defined or modified by the user. Also note that, for each alert corresponding to a policy 104 in policy-based automation system 100, alert definition mechanism 112 may present a distinct graphical user interface (GUI) with user interface elements displayed in accordance with the various parameters for that particular alert. In one embodiment, the alert definition mechanism 112 GUI for particular alerts may be modifiable/customizable. For example, one or more new parameters may be added to an alert, and corresponding user interface elements may be added to a particular alert definition mechanism 112 GUI for that alert to manipulate those new parameters. As another example, various user interface elements may be moved on the GUI, renamed, otherwise modified, or deleted as necessary or desired. One embodiment may provide a utility for, creating, designing and modifying the alert definition mechanism 112 GUIs in policy-based automation mechanism 100. Several exemplary alert definition mechanism 112 GUIs are illustrated in FIGS. 2 through 9, which are described below.

Figure 2:
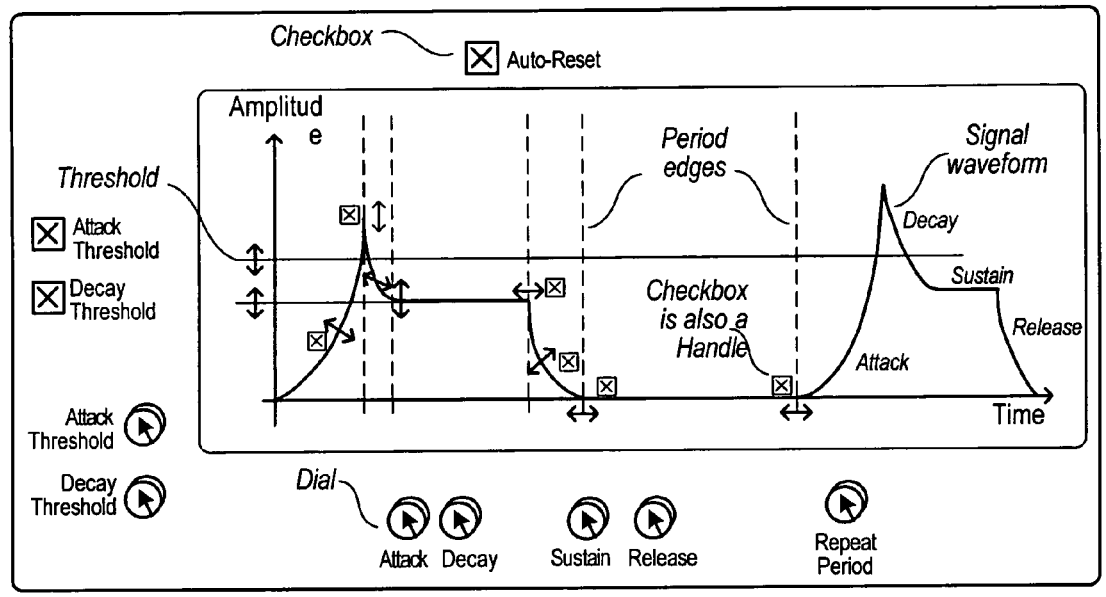
FIG. 2 illustrates an exemplary alert definition mechanism graphical user interface (GUI) according to one embodiment.

FIG. 2 illustrates an exemplary alert definition mechanism graphical user interface (GUI) according to one embodiment, and is not intended to be limiting. Embodiments of the alert definition mechanism may display a signal as a curve or waveform on a graph, with time as one axis and amplitude as another axis. Typically, but not necessarily, time will be on the horizontal (X) axis, and amplitude of some signal that is being monitored on the vertical (Y) axis of the graph. Typically, a signal waveform to be monitored will have a "zero" point, but from time to time the signal waveform may spike positively or negatively (i.e., an impulse may occur). When an impulse occurs, it may be necessary or desired to perform some action or actions in an attempt to bring the signal waveform back to normal (back to the zero point). Embodiments of the alert definition mechanism may be used to define where on an impulse in a signal waveform an alert (or alerts) are to be triggered, and the alert definition(s) may then be used in a policy definition of a policy-based automation system to detect an alert condition in the monitored signal waveform, raise the alert, and respond with an appropriate action or actions specified in the policy definition.

In one embodiment, one or more thresholds may be displayed as solid, dashed, and/or colored lines (the lines representing thresholds may be referred to as alert parameter user interface elements) parallel to the time axis of the graph, and one or more period edges or boundaries may be displayed as solid, dashed, and/or colored lines perpendicular to the time axis of the graph (the lines representing period edges are also alert parameter user interface elements). One or more points on the signal waveform may be user-selectable and draggable (e.g., by clicking and dragging with a mouse or other cursor control device) to reshape the waveform as necessary or desired. In addition, the thresholds and period edges may be user-selectable and draggable to define the associated threshold and period parameters. In one embodiment, "handles" may be graphically displayed at locations on the waveform or other lines that may be user-selected and dragged.

One embodiment may provide graphically-represented knobs, dials, or other control user interface elements that are user-selectable and -manipulable to adjust the associated alert parameter user interface elements as necessary or desired. One embodiment may provide checkboxes for at least some of the parameters that may, for example, be used to enable or disable a particular parameter. Note that some embodiments may also include other user interface elements in the alert definition mechanism GUI, such as alphanumeric text entry boxes, popup menus, list boxes, buttons, etc., at least some of which may be used to manipulate the signal waveform and other parameters.

Embodiments may include an "accept" or "save" user interface element (e.g., a button) that is user-selectable to commit an alert definition when the user has completed the alert definition. One embodiment may include a "reset" user interface element (e.g., a button) that is user-selectable to reset the parameters of an alert definition to previously saved values (updating the GUI display accordingly). One embodiment may include a "default" user interface element (e.g., a button) that is user-selectable to reset the parameters of an alert definition to default values (updating the GUI display accordingly). Other embodiments may include other user interface elements (buttons, menus, etc.) for performing other functions.

Signal parameters that may be included for triggering and/or resetting an alert and that may be manipulated using the user interface elements of an alert definition mechanism 112 GUI may include one or more of, but are not limited to:

Absolute threshold point after attack phase
 Attack phase rate (steepness of slope) during attack phase
 Absolute threshold after decay phase
 Absolute threshold point after decay phase
 Decay rate
 Sustain period
 Release rate
 Period between impulses
 Auto-Reset On an impulse (spike) in a signal waveform, there are generally four phases. The attack phase is the initial spike upwards (or downwards on a negative impulse). The decay phase is when the impulse is coming down (or going up for a negative impulse) to some intermediate, non-zero point. The sustain phase (or period) is how long the signal waveform remains at the intermediate point (the signal waveform remains or "sustains" at a relatively constant level). The release phase is when the signal waveform returns down (or up, for a negative impulse) to "zero" or the base signal level. Rate refers to the slope of the curve at a particular point.

An embodiment of the alert definition mechanism may, for example, be used to configure an alert definition that indicates that the policy-based automation system is to trigger an alert on the absolute threshold point at the peak of the attack phase. As another example, the alert definition mechanism may be used to configure an alert definition that indicates that the policy-based automation system is to trigger an alert at a threshold point on the rate (slope) of the attack phase, in other words if the initial spike of the impulse exceeds some rate (slope) threshold. As yet another example, the alert definition mechanism may be used to configure an alert definition (and corresponding policy definition) that indicates that the policy-based automation system is to not trigger another alert and corresponding response action if this same impulse occurs within a specified period to avoid generating alerts for multiple recurrences of the same event (impulse). Note that these are exemplary use cases, and that one skilled in the art will recognize that the alert definition mechanism may be used to define a wide variety of alert conditions for a signal waveform.

Note that not all of the parameters listed above may be useful when creating a particular alert definition. In FIG. 2, for example, not all of the parameters have associated dials that can be manipulated as well as handles on the graph. However, embodiments of the alert definition mechanism may provide a modifiable graphical user interface that allows user interface elements for controlling one or more of these parameters, and possibly other parameters, to be added to an alert definition mechanism GUI for the particular alert if necessary or desired. Embodiments may provide additional capabilities, such as adding additional threshold levels using GUI mechanisms such as right-clicking on the signal waveform to display a popup menu with an option to add a threshold at that level. Note that, in one embodiment, multiple severities for the same alert may be optionally provided by defining multiple thresholds.

The auto-reset user interface element (in this example, a checkbox) may be used to specify whether the alert automatically resets when the signal waveform returns to "normal" or drops below the threshold that triggered the alert, or "latches" and does not automatically reset when the signal waveform returns to "normal". In the latter case, it may be necessary or desired for a human to acknowledge that the alert has happened and to manually reset the alert, typically after responding to and correcting a problem condition that generated the alert. The ability to override the automatic resetting of an alert may be useful, for example, when tracking changes in an environment where there are several potential workflows, and where a record or log of the system being monitored is maintained in which all such alerts are to be recorded. An alert may occur, for example, in the middle of the night, or on a weekend or holiday, and if the alert automatically resets, the alert might go unnoticed by the operator/administrator. If the alert does not automatically reset, the operator/administrator may be more likely to notice the alert and take any appropriate action.

Unlike conventional alert definition mechanisms that rely on Wizard-type interfaces, embodiments of the alert definition mechanism described herein provide a basic graphical/pictorial model for defining signal waveforms and parameters for alerts that, once learned, requires little or no new understanding or relearning of principles by the user when using the alert definition mechanism to define other, perhaps even more complex, alerts.

As mentioned above, the exemplary alert definition mechanism GUI of FIG. 2 displays a signal as a curve or waveform on a graph, with time as one axis and amplitude as another axis. In some embodiments, frequency may be used on one axis rather than time to thus display amplitude against frequency. This may be used, for example, to define alerts when the frequency of an oscillating signal changes. For example, a bandwidth-type plot may represent the oscillating signal as a thin band (allowing for the variation in the exact signal about a central frequency) and limits may be set using the user interface on either side of the band which, if crossed, generate an alert. Note that an oscillating signal is not a finite impulse response as it does not decay to zero. As an example of a case where embodiments may be used for defining alerts for monitoring an oscillating signal, TCP/IP packet bandwidth may be expressed in the frequency domain rather than the time domain.

FIGS. 3 through 9 illustrate several exemplary alert definition mechanism GUIs for defining various alerts and alert parameters for signal waveforms, and illustrate several different capabilities and user interface elements of the alert definition mechanism as described herein. Note that these Figures show areas under the signal waveform in various shades. On a monitor displaying the alert definition mechanism GUIs, in one embodiment, these areas may be shaded and/or colored to indicate the effects of manipulating user interface elements of the alert definition mechanism GUIs to the user more clearly. Also note that various lines, such as threshold lines and period edge indicators, may be displayed in various colors, and/or may be dashed, dotted, or solid lines, with various colors and effects used to clearly distinguish different parameters. Also note that these Figures are exemplary, and are not intended to be limiting.

Figure 3:
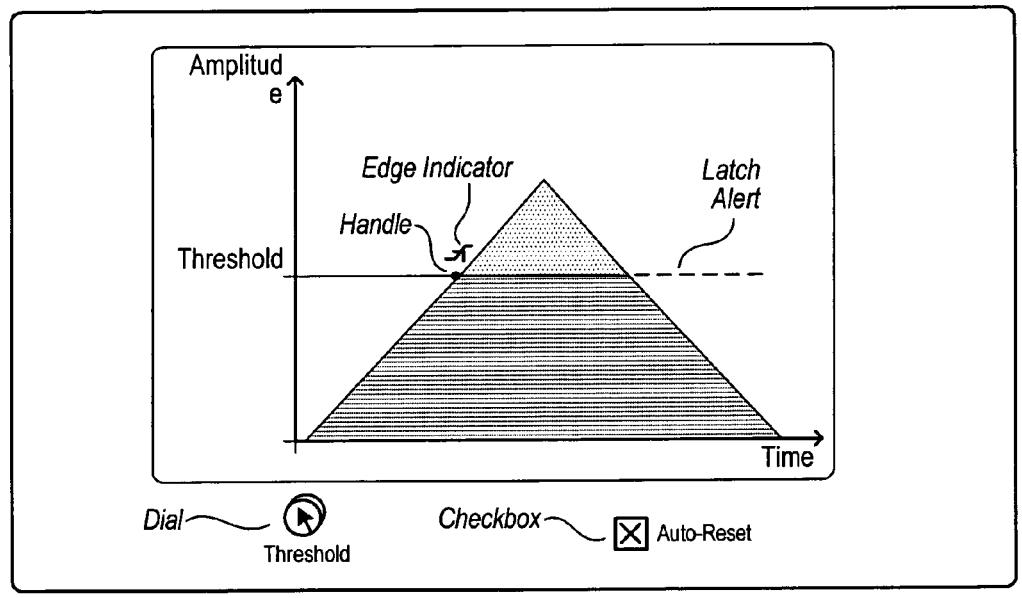
FIG. 3 illustrates an exemplary alert definition mechanism GUI that allows the setting of a trigger point for an alert, and the ability to optionally automatically reset the alert if necessary or desired according to one embodiment.

FIG. 3 illustrates an exemplary alert definition mechanism GUI that allows the setting of a trigger point for an alert, and the ability to optionally automatically reset the alert if necessary or desired according to one embodiment. In this example, the threshold dial may be turned to move the threshold up or down. Alternatively, the user may select and drag a handle up and down with a cursor control device, such as a mouse, to move the threshold. Note that, in exemplary FIGS. 3 through 9, a dot is used to indicate a handle on a line or on the signal waveform. Other embodiments may use other symbols for handles. In one embodiment, as the threshold is moved, the line and shading colors may change to indicate the effect to the user more clearly. The auto-reset checkbox may be checked by the user if the alert should reset automatically once the signal is below the threshold, and unchecked otherwise. The dotted line indicates a latched alert if not clocked.

This example introduces an edge indicator user interface element. In one embodiment, an edge indicator may be user-selectable (e.g., double-clickable using a cursor control device such as a mouse) to toggle the trigger direction to specify whether the trigger happens on a rising or falling edge. A symbol representing the edge indicator may be "flipped" to indicate the change in direction. Note that, in exemplary FIGS. 3 through 9, a small curve with an arrowhead is used as an edge indicator. Other embodiments may use other symbols for the edge indicators.

Figure 4:
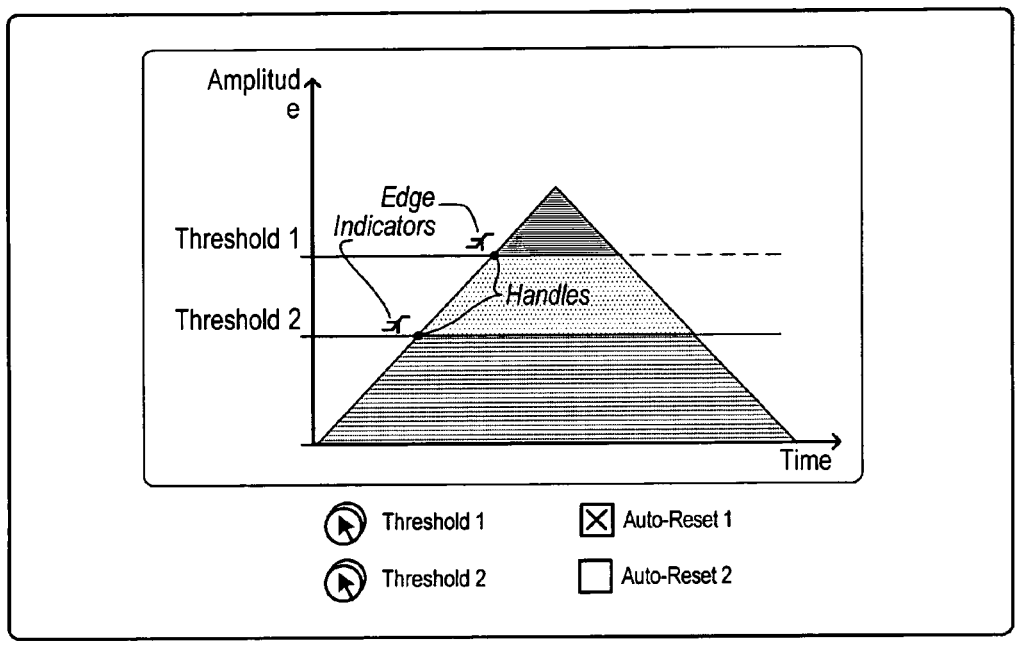
FIG. 4 illustrates an exemplary alert definition mechanism GUI with multiple thresholds according to one embodiment.

FIG. 4 illustrates an exemplary alert definition mechanism GUI with multiple thresholds according to one embodiment. This example is similar to that of FIG. 4, but includes multiple thresholds. In this example, threshold 2 does not reset automatically, which may be indicated by a solid line and/or different shading and/or coloring. Note that the multiple thresholds reuse the same GUI paradigm, facilitating learning. In one embodiment, each one of the multiple thresholds may be used to raise independent alerts for the signal waveform. As in FIG. 3, the edge indicators are user-selectable to indicate whether the trigger happens on a rising or falling edge. In one embodiment, a popup menu may be provided to add or remove thresholds to the alert definition mechanism GUI. Note that a popup menu such as this one that may be used to add, remove, or modify other user interface elements (e.g., control user interface elements and alert parameter user interface elements) on the GUI may be referred to herein as a GUI configuration user interface element.

Figure 5:
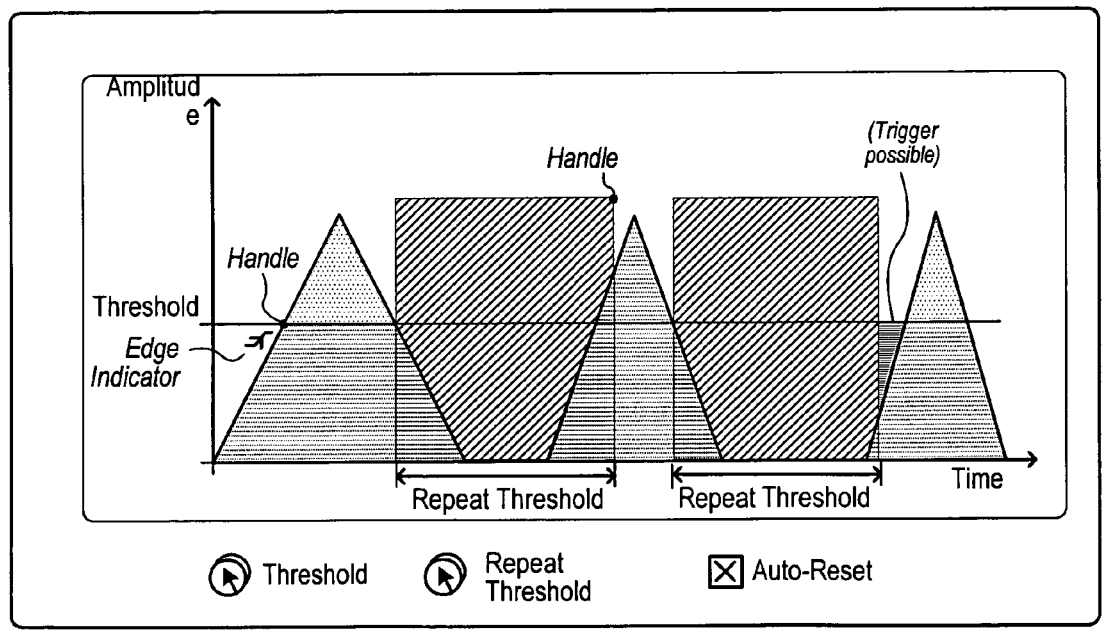
FIG. 5 illustrates an exemplary alert definition mechanism GUI that shows a period between impulses (repeat period threshold) according to one embodiment.

FIG. 5 illustrates an exemplary alert definition mechanism GUI that shows a period between impulses (repeat period threshold) according to one embodiment. This example is similar to that of FIG. 3, but includes a repeat threshold period that must elapse before the trigger can fire again. In one embodiment, this may be indicated on the display by the middle spike of the signal waveform being shaded or colored differently above the threshold than the other spikes where the trigger does fire, and by the differently shaded or colored "trigger possible" region. Note that the same handle and dial paradigms are used as in the previous examples. The repeat threshold handle may be moved from side to side (as opposed to up and down as for the threshold) to increase or decrease the repeat threshold. Optionally, the repeat threshold dial may be manipulated to increase or decrease the repeat threshold. Note that the second repeat threshold region may move in sympathy with the first to show the overlap.

Figure 6:
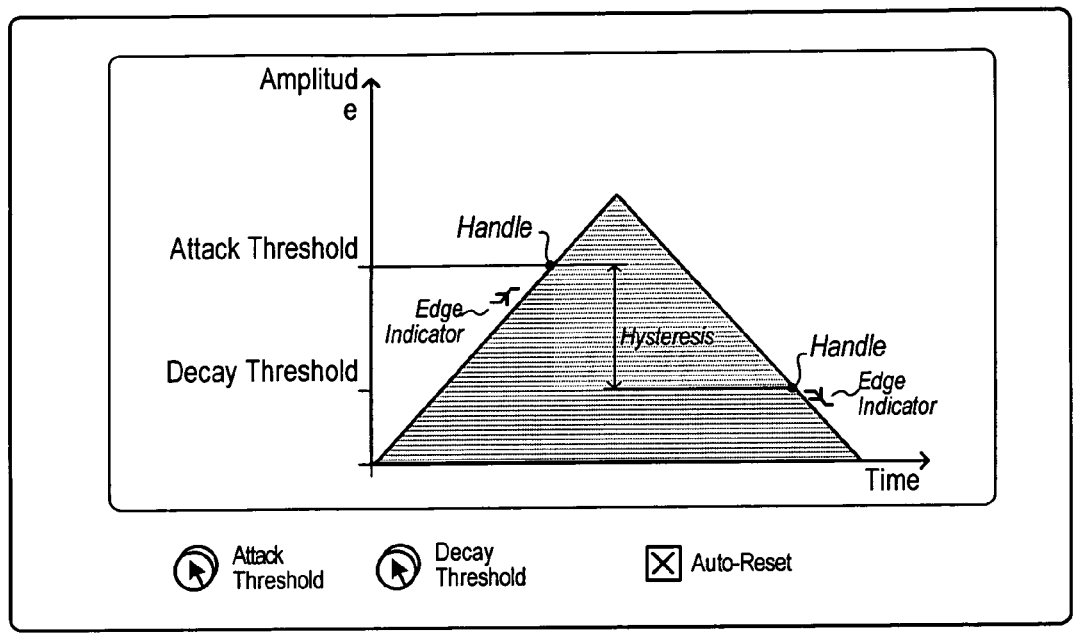
FIG. 6 illustrates an exemplary alert definition mechanism GUI that shows a sample trigger with hysteresis and separate attack and decay thresholds according to one embodiment.

FIG. 6 illustrates an exemplary alert definition mechanism GUI that shows a sample trigger with hysteresis and separate attack and decay thresholds according to one embodiment. This example is similar to that of FIG. 3, except in this case there is hysteresis in the auto-reset point. In other words, the signal must drop to a level below the attack threshold in order to reset. The same GUI paradigms are applied in this example. There are two dials and two handles, one for each threshold. In one embodiment, the line and region coloring and/or shading may change as the parameters are varied to show the effects. There is also an edge indicator for each threshold, although in this case the two edge indicators are complementary. That is, the two edge indicators point in opposite directions, and if one is reversed, the other is also reversed.

Figure 7:
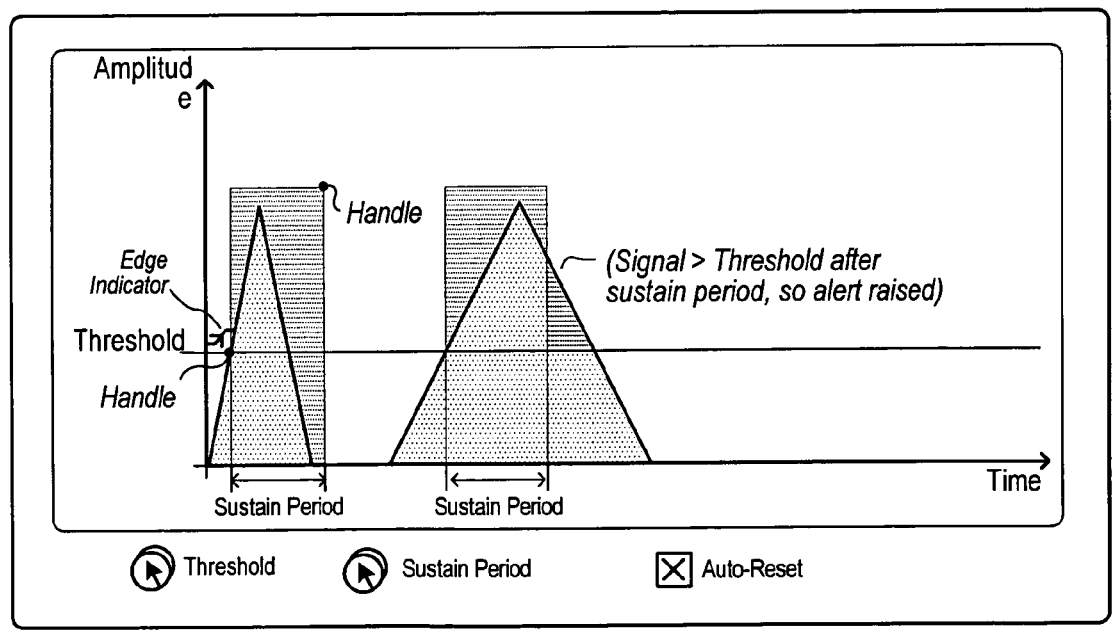
FIG. 7 illustrates an exemplary alert definition mechanism GUI that shows a sustained trigger according to one embodiment.

FIG. 7 illustrates an exemplary alert definition mechanism GUI that shows a sustained trigger according to one embodiment. Superficially, this example looks similar to that of FIG. 5. However, the horizontally sliding shaded regions define the sustain period, not the minimum repeat period. The sustain period is the time which must elapse while the signal is still above the threshold. The same GUI paradigms are applied in this example. Again, in one embodiment, colored and/or shaded regions and lines may be used to indicate whether and when in the cycle the alert is raised. The sustain period handle may be moved horizontally by the user using a cursor control device, or the sustain period dial may be manipulated by the user to achieve the same effect.

Figure 8:
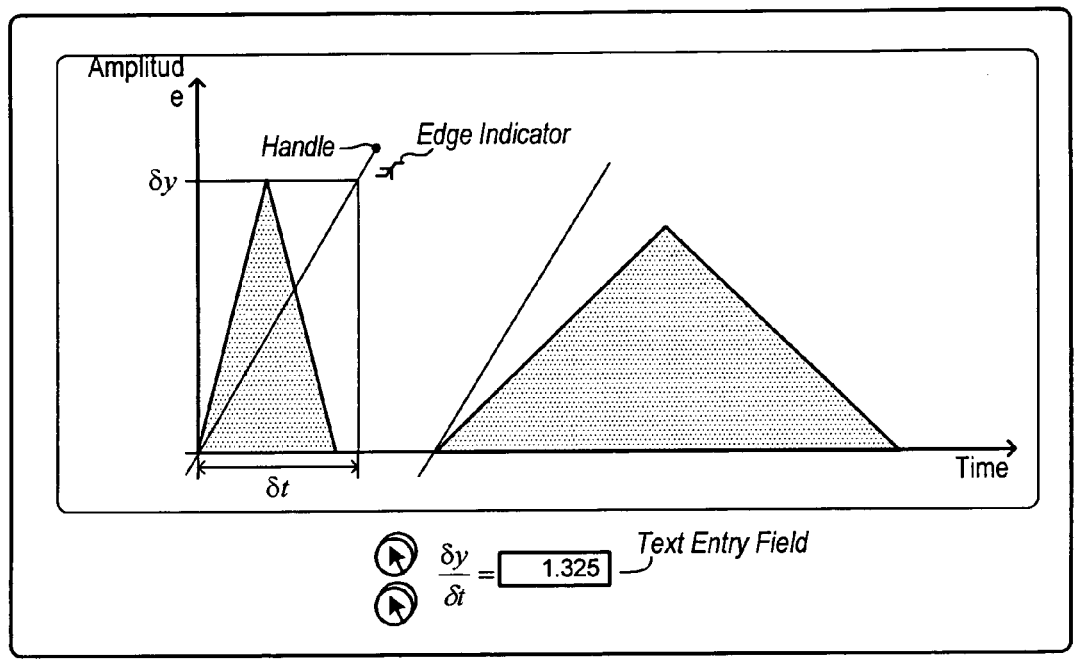
FIG. 8 illustrates an exemplary alert definition mechanism GUI that shows a trigger by attack gradient (rate of change) according to one embodiment.

FIG. 8 illustrates an exemplary alert definition mechanism GUI that shows a trigger by attack gradient (rate of change) according to one embodiment. In this example, the alert is raised when the gradient dy/dt exceeds some value. The same GUI paradigms are applied in this example, although in this case two dials are used but only one handle, which may be moved in both axes using a cursor control device. This example also shows the use of a user interface element which may be used to display and enter the value of dy/dt. Similar text and/or numeric user interface elements may also be used on other GUIs to display and/or accept the entry of parameter values. Again, coloring and/or shading of lines and regions may be used to indicate the shape that triggers the alert.

Figure 9:
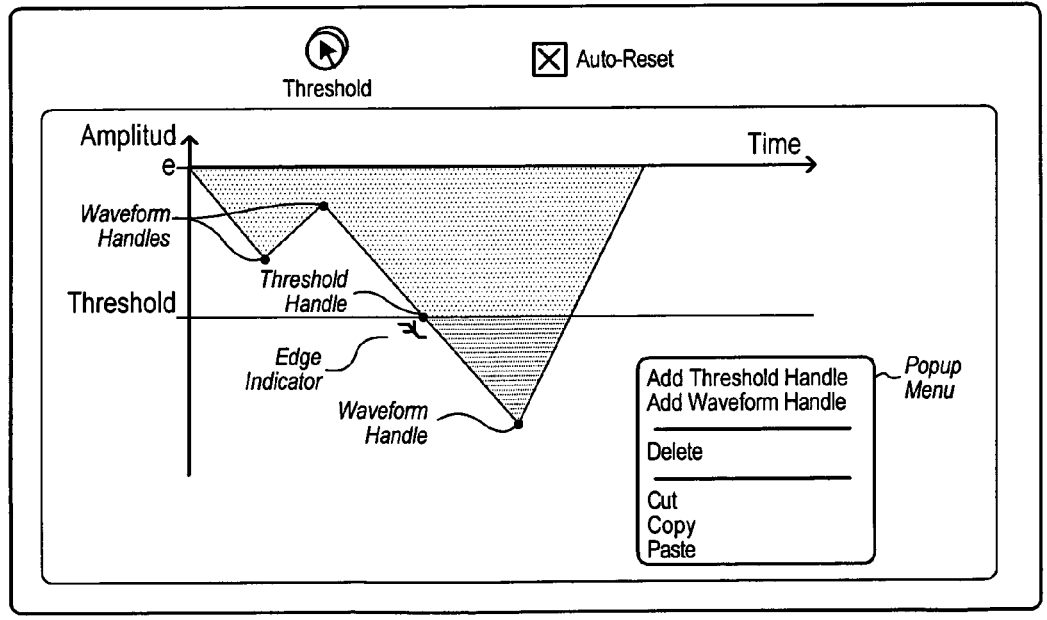
FIG. 9 illustrates an exemplary alert definition mechanism GUI that shows a negative edge trigger, waveform handles, and an exemplary popup menu, according to one embodiment.

FIG. 9 illustrates an exemplary alert definition mechanism GUI that shows a negative edge trigger, waveform handles, and an exemplary popup menu, according to one embodiment. In this example, the threshold is triggered by a negative edge. As previously described, double-clicking on the edge indicator toggles the direction of the edge. Note that, in this example, the time axis is displayed at the top of the graph to more clearly indicate that this is a negative signal waveform. Note the waveform handles that may be manipulated (e.g., dragged) by the user with a cursor control device (e.g., a mouse) to shape the signal waveform as necessary or desired. The threshold handle allows the user to move the threshold up or down with a cursor control device.

In one embodiment, popup menus may be activated that allow the user to edit the contents of the particular alert definition mechanism GUI. In one embodiment, different types of user interface elements may be selected, and a popup menu may be user-activated to edit that particular type of user interface element. In one embodiment, the popup menu may be activated using the right (or equivalent) cursor control device button after selecting a user interface element. In this example, a popup menu for handles has been activated that allows the user to add handles to thresholds and/or to the waveform, to delete the selected handle, and possibly to perform other editing functions on the selected user interface element.

Figure 10:
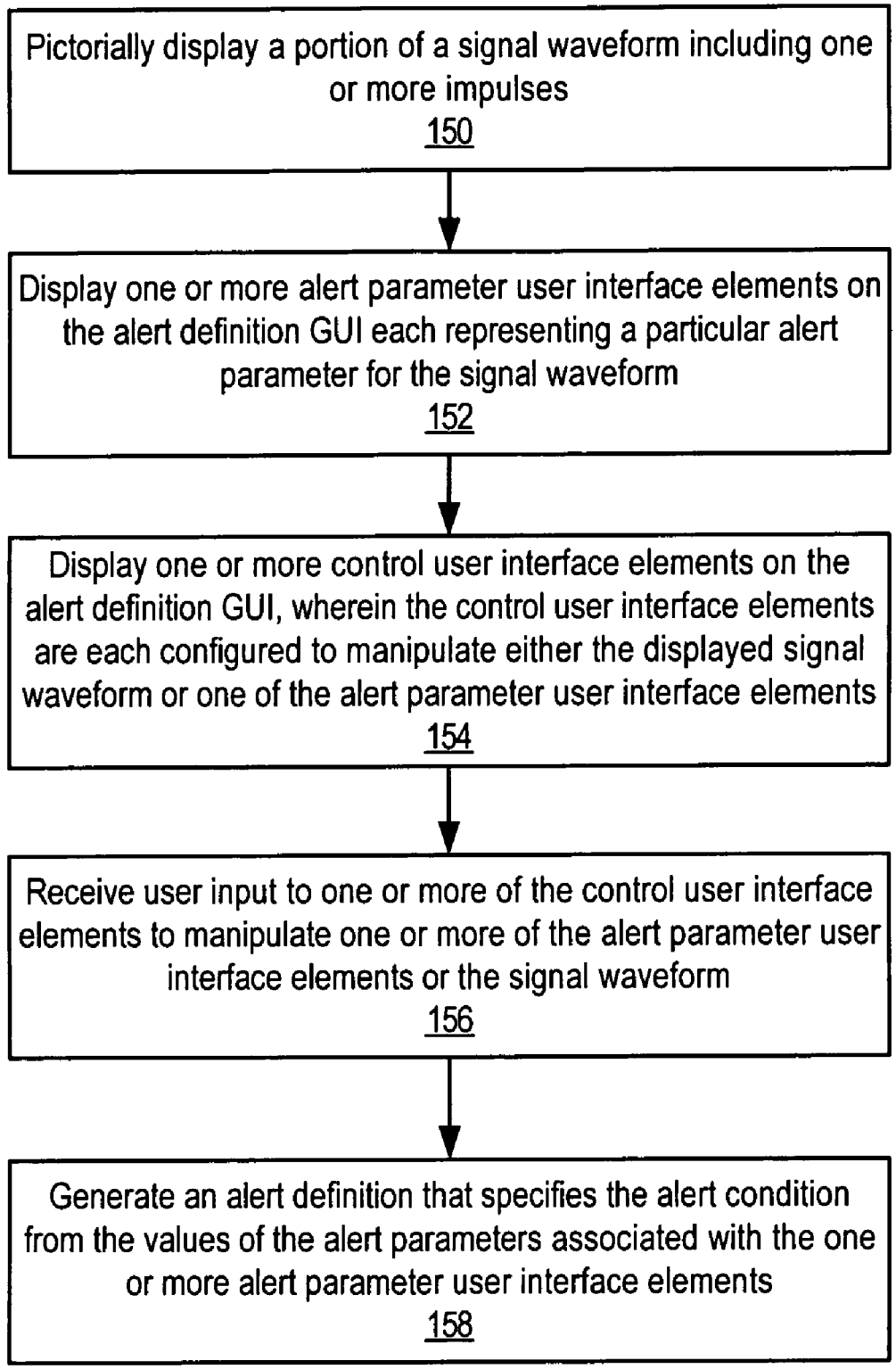
FIG. 10 is a flowchart of a method for graphically defining an alert condition for a signal waveform in a policy-based automation system, where the signal waveform corresponds to a metric for an object monitored by the policy-based automation system, according to one embodiment.

FIG. 10 is a flowchart of a method for graphically defining an alert condition for a signal waveform in a policy-based automation system, where the signal waveform corresponds to a metric for an object monitored by the policy-based automation system, according to one embodiment. In one embodiment, the policy-based automation system may be a Storage Area Network (SAN) management system. As indicated at 150, a portion of the signal waveform including one or more impulses for which the alert condition is to be defined may be pictorially displayed on a graph in an alert definition graphical user interface (GUI). As indicated at 152, one or more alert parameter user interface elements may be displayed on the alert definition GUI each representing a particular alert parameter for the signal waveform. A position of an alert parameter user interface element relative to the signal waveform may correspond to a particular value for the associated alert parameter. Alert parameters may include one or more of, but are not limited to, thresholds, rates, and periods for the one or more impulses of the signal waveform. As indicated at 154, one or more control user interface elements may be displayed on the alert definition GUI. Each control user interface element may be configured to receive user input to manipulate either the displayed signal waveform or one of the alert parameter user interface elements. In one embodiment, the control user interface elements may include one or more of, but are not limited to, one or more of dials, handles, sliders, buttons, checkboxes, and numeric entry boxes.

As indicated at 156, the alert definition mechanism may receive user input to one or more of the control user interface elements to manipulate one or more of the alert parameter user interface elements on the alert definition GUI and/or to manipulate the signal waveform. Manipulating one of the alert parameter user interface elements may cause a corresponding change in the value of the associated alert parameter. As indicated at 158, after the user has completed manipulations of the control user interface elements to define the alert condition, the alert definition mechanism may generate an alert definition that specifies the alert condition from the values of the alert parameters associated with the one or more alert parameter user interface elements.

In one embodiment, the alert definition may be associated with one or more response actions for the alert condition specified by the alert definition in a policy definition on the policy-based automation system. The policy-based automation system may be configured to monitor the corresponding metric for the monitored object and to detect an occurrence of the alert condition in the monitored metric as specified by the alert definition. In response to detecting the alert condition, the policy-based automation system may be configured to perform the one or more response actions specified in the policy.

In one embodiment, an auto-reset checkbox button user interface element may be displayed on the alert definition GUI. The auto-reset user interface element may be configured to toggle between automatically resetting the alert when the signal waveform returns to normal and latching the alert when the signal waveform returns to normal.

One embodiment may be configured to display a GUI configuration user interface element, such as a popup menu, on the alert definition GUI. The GUI configuration user interface element may be configured to receive user input to add or remove control user interface elements or alert parameter user interface elements to the alert definition GUI.

Figure 11:
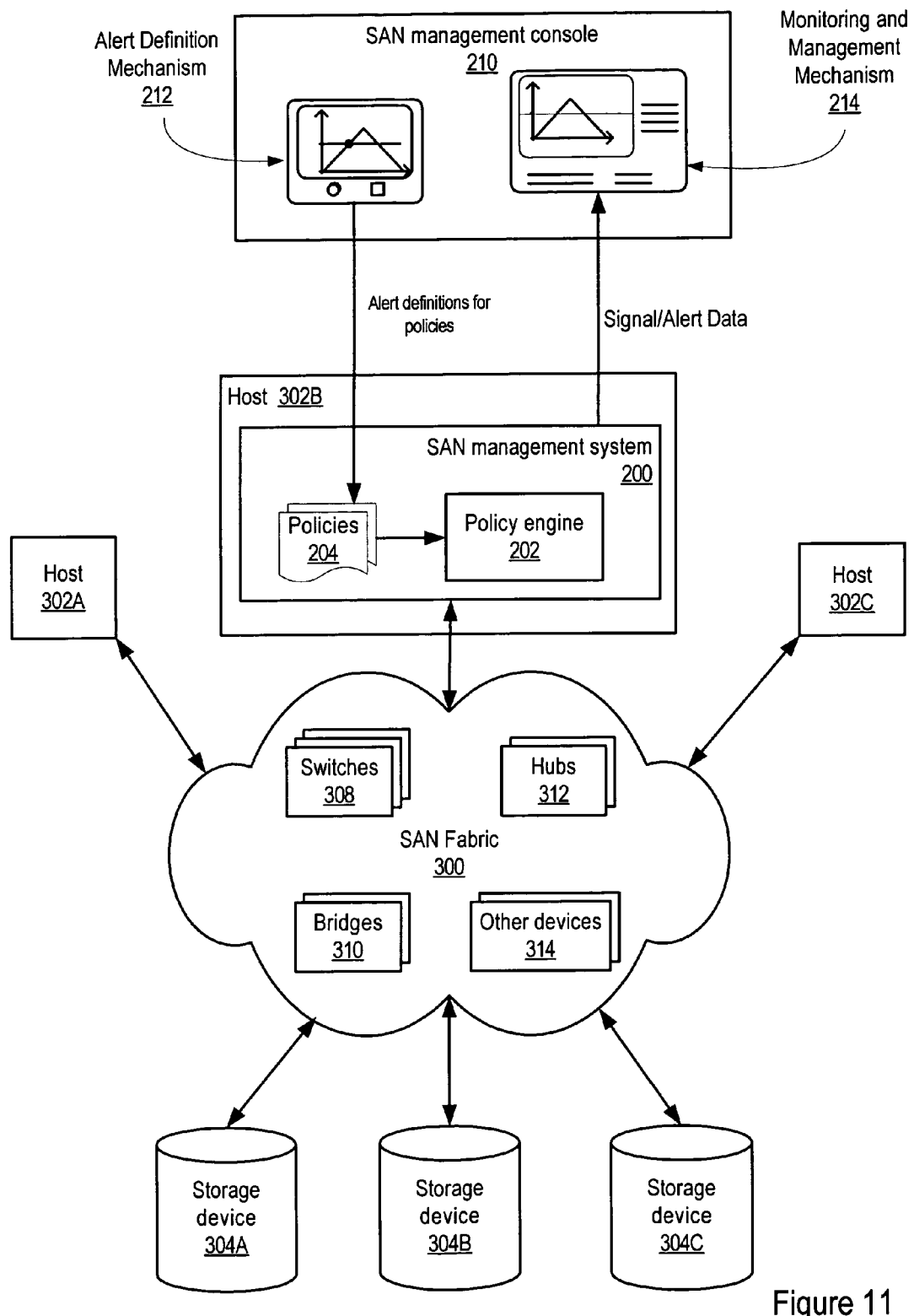
FIG. 11 shows an exemplary SAN management system implementing an embodiment of the alert definition mechanism.

An exemplary policy-based automation application for embodiments of the alert definition mechanism is in a SAN management system that use policies to monitor and manage various SAN objects. FIG. 11 shows an exemplary SAN management system implementing an embodiment of the alert definition mechanism as described herein. Embodiments of the alert definition mechanism 212 may be used in the SAN management system to provide a graphical user interface (GUI) on a SAN management console 210 through which an administrator may define and/or modify the alert conditions for policies 204 used in the SAN management system 200.

For one embodiment, SAN may be described as a high-speed, special-purpose network that interconnects data storage devices 304 with associated data servers (hosts 302) on behalf of a larger network of users. This dedicated network may employ Fibre Channel technology. A SAN may be part of the overall network of computing resources for an enterprise or other entity. A SAN may include one or more hosts 302, one or more storage devices 304, and one or more SAN fabrics 300. A SAN may also include one or more administration systems, such as SAN management console 210. One or more end-user platforms (not shown) may access the SAN, typically via a LAN or WAN connection to one or more of the hosts 302.

Storage devices 304 may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Hosts 302 may run any of a variety of operating systems, including, but not limited to, Solaris 2.6, 7 or 8, Microsoft Windows NT 4.0 (Server and Enterprise Server), and Microsoft Windows 2000 (Server, Advanced Server and Datacenter Editions). Each host 302 is typically connected to the SAN fabric 300 via one or more Host Bus Adapters (HBAs).

The hardware that connects hosts 302 (and other devices such as workstations) to storage devices 304 in a SAN may be referred to as a fabric 300. The SAN fabric 300 enables server-to-storage device connectivity through Fibre Channel switching technology. The SAN fabric 300 hardware may include one or more of switches 308 (also referred to as fabric switches), bridges 310, hubs 312, or other devices 314 such as routers, as well as the interconnecting cables (for Fibre Channel SANs, fibre optic cables).

In one embodiment, the SAN management system may include a policy engine 202 that performs the instructions described in all policies 204 enabled on the SAN. The policy engine 202 may receive a stream or streams of real-time data collected from objects on the SAN and compare data values with the conditions described in its policies 204. The policy engine 202 may use current values collected from the data stream(s), and may retain the values in a buffer long enough to determine whether an alert threshold has been met. For example, a threshold may be defined as "switch port utilization greater than eighty percent for two minutes." In this example, the policy engine 202 may monitor the current value of a port utilization collector over a two-minute period. When the alert condition for a particular policy 204 is met, the policy engine 202 performs the actions described in the policy 204.

Policies 204 may be viewed as rules that may be used to help manage a SAN by automating responses to certain events and conditions. Policies 204 may be used by the policy engine 202 to detect when something goes wrong, and may be used to anticipate and handle problems before (or when) they occur. A policy 204 may include a condition to monitor, such as a high percentage of bandwidth utilization on a switch port, and a set of actions to take when that condition is met, such as raising alerts on the monitoring and management mechanism user interface on SAN management console 210, sending e-mail, triggering SNMP traps, invoking commands and/or scripts, and/or starting workflows for semi-automatic actions.

A policy 204 may indicate a particular object or type of object to monitor. In general, any object on the SAN may be monitored. Objects that may be monitored include, but are not limited to, fabrics 300, switches 308, switch ports, hosts 302, and storage devices 304. A policy may include a description of the condition to monitor on an object. The condition may be based on a metric or metrics collected from the object. The condition may be either a quantitative evaluation (for example, less or more than a certain percentage of available disk space) or a textual value (such as whether a switch's status is "offline" or "online").

The conditions available for a policy may be determined by the type of object being monitored. Different types of policy conditions may result in different types of alarms. There are many possible types of conditions for various objects managed by the SAN management server 200. One type of policy is a threshold condition with action policy. These policies may be used to monitor an object and, for example, detect when a particular numeric threshold is reached and/or sustained for a period. As an example of a threshold condition with action policy, "If port utilization >90% of capacity for 1 minute, then post a critical alert to the SAN manager and send e-mail to the administrator." A threshold condition with action policy may also provide a condition to reset the alert when the value being monitored returns to a normal, or below threshold value. For example, "If port utilization <=75% for 1 minute, then clear the critical alert." Embodiments of the alert definition mechanism 212 may provide a graphical user interface (GUI) on a SAN management console 210 through which an administrator may define the alert conditions for threshold condition with action policies used in the SAN management system 200.

Figure 12:
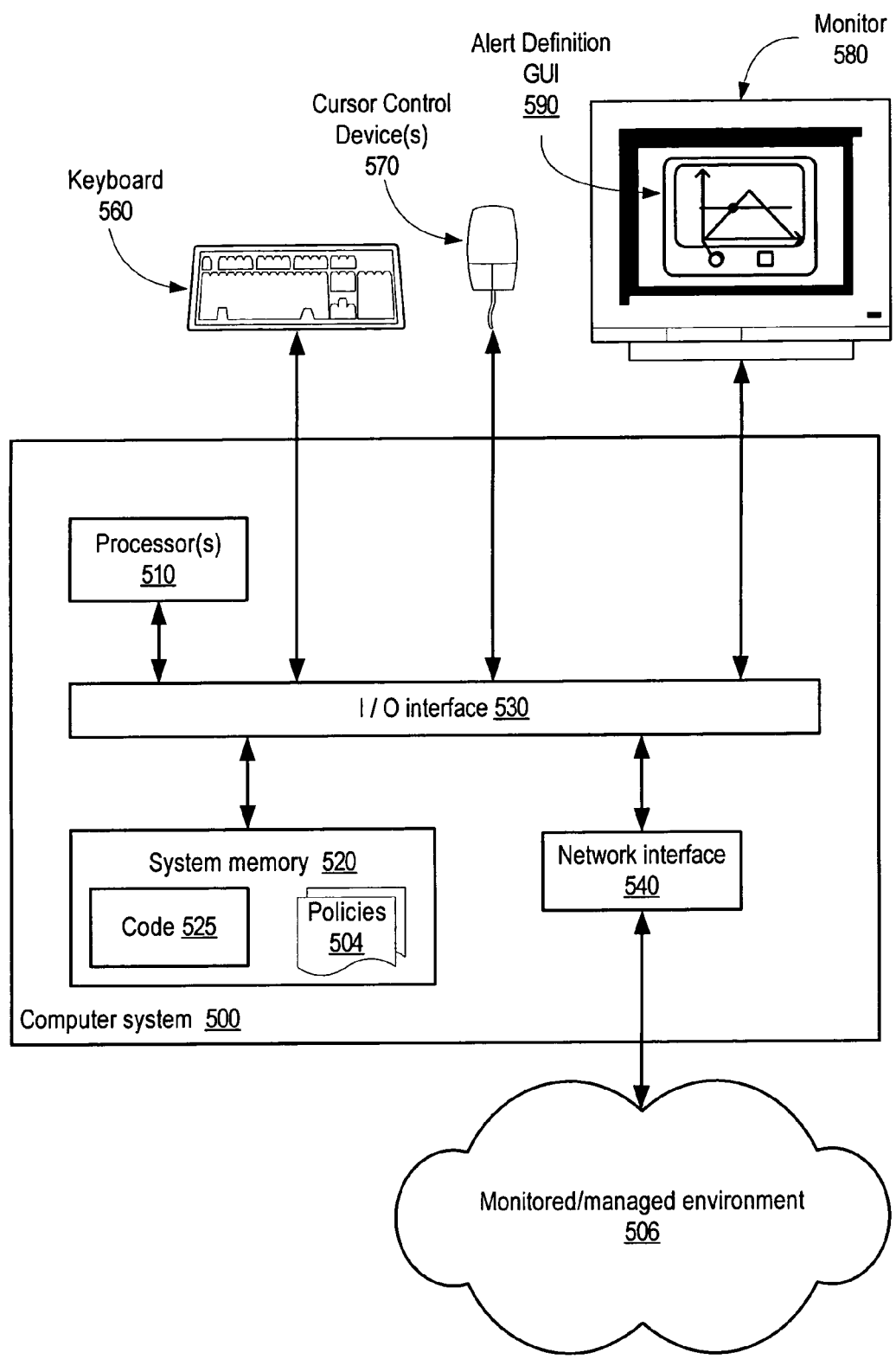
FIG. 12 is a block diagram illustrating an exemplary embodiment of a computer system that may be used to implement an embodiment of the alert definition mechanism.

In one embodiment, a system that implements an embodiment of the alert definition mechanism, such as SAN management console 210 illustrated in FIG. 11, may include a general-purpose computer system that includes or is configured to access one or more computer-accessible media, such as computer system 500 illustrated in FIG. 12. In the illustrated embodiment, computer system 500 includes one or more processors 510 coupled to a system memory 520 via an input/output (I/O) interface 530. Computer system 500 further includes a network interface 540 coupled to I/O interface 530. In some embodiments, computer system 500 may be illustrative of a system that implements an embodiment of the alert definition mechanism, while in other embodiments a system that implements an embodiment of the alert definition mechanism may include elements in addition to computer system 500.

In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for an alert definition mechanism and an associated policy-based automation system, are shown stored within system memory 520 as code 525. In addition, policies 504 for which an embodiment of the alert definition mechanism may be used to define alert definitions are shown stored within system memory 520.

In one embodiment, I/O interface 530 may be configured to coordinate I/O traffic between processor 510, system memory 520, and any peripheral devices in the device, including network interface 540, or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

One or more peripheral devices may couple to system 500 via I/O interface 530, such as a keyboard 560, one or more cursor control devices 570 (such as a mouse), and one or more monitors 580 (which may also be referred to as displays or display devices). Monitor 580 may be configured, for example to display alarm definition mechanism GUIs 590 as described herein. Keyboard 560 and/or cursor control device (s) 570 may be configured to generate user input to the alarm definition GUI 590 by manipulating various user interface elements of the GUI to define and modify alert conditions to be used in policies 504, as described herein.

Network interface 540 may be configured to allow data to be exchanged between computer system 500 and other devices on a network, such as other computer systems, for example. In particular, network interface 540 may be configured to allow communication between computer system 500 and the various objects in a environment 506 monitored and managed by a policy-based automation system, as described above. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet network, for example. Additionally, network interface 540 may support communication via telecommunications/telephony networks such as analog voice networks or digital fiber communications networks, via storage area networks such as Fibre Channel SANs, or via any other suitable type of network and/or protocol.

In some embodiments, system memory 520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 500 via I/O interface 530. A computer-accessible medium may also include any volatile or non-volatile media such as RAM (e.g. SDRAM, DDR SDRAM, RDRAM, SRAM, etc.), ROM, etc, that may be included in some embodiments of computer system 500 as system memory 520 or another type of memory. Further, a computer-accessible medium may include transmission media or signals such as electrical, electromagnetic, or digital signals, conveyed via a communication medium such as a network and/or a wireless link, such as may be implemented via network interface 540.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for graphically defining an alert condition for a signal waveform in a policy-based automation system, wherein the signal waveform corresponds to a metric for an object monitored by the policy-based automation system, the method comprising:
   pictorially displaying on a display device a portion of the signal waveform including one or more impulses for which the alert condition is to be defined, wherein the portion of the signal waveform is displayed on a graph in an alert definition graphical user interface (GUI) on the display device;
   displaying a plurality of alert parameter user interface elements with the portion of the signal waveform displayed on the graph in the alert definition GUI, wherein each alert parameter user interface element represents a different one of a plurality of alert parameters for the signal waveform, wherein a position of each alert parameter user interface element relative to the displayed portion of the signal waveform in the alert definition GUI corresponds to a particular value for the respective alert parameter, and wherein the position of at least one of the plurality of alert parameter user interface elements relative to the displayed portion of the signal waveform in the alert definition GUI specifies a state change of the signal waveform at which the alert condition is raised to alert the policy-based automation system that the metric for the object monitored by the policy-based automation system indicates a condition of the object to which the policy-based automation system is to respond;
   displaying a plurality of alert parameter control user interface elements in the alert definition GUI, wherein each of the plurality of alert parameter control user interface elements corresponds to a different one of the plurality of alert parameter user interface elements, wherein each of the plurality of alert parameter control user interface elements is configured to receive user input to manipulate the position of a corresponding one of the plurality of alert parameter user interface elements relative to the displayed portion of the signal waveform in the alert definition GUI;
   receiving user input to at least one of the plurality of alert parameter control user interface elements to manipulate the positions of corresponding ones of the plurality of alert parameter user interface elements relative to the displayed portion of the signal waveform in the alert definition GUI, wherein manipulating the position of an alert parameter user interface element causes a corresponding change in the value of the associated alert parameter; and
   generating an alert definition for the policy-based automation system that specifies the alert condition from the values of the plurality of alert parameters associated with the plurality of alert parameter user interface elements;
   wherein the policy-based automation system is a computing environment management system.

2. The method as recited in claim 1, further comprising:
   displaying one or more signal waveform control user interface elements in the alert definition GUI, wherein each of the one or more signal waveform control user interface elements is configured to receive user input to manipulate the displayed portion of the signal waveform in the alert definition GUI; and
   receiving additional user input to at least one of the signal waveform control user interface elements to manipulate the displayed portion of the signal waveform in the alert definition GUI prior to said generating an alert definition from the values of the plurality of alert parameters associated with the plurality of alert parameter user interface elements.

3. The method as recited in claim 1, wherein the policy-based automation system is a Storage Area Network (SAN) management system.

4. The method as recited in claim 1, wherein the plurality of alert parameters include one or more of thresholds, rates, and periods for the one or more impulses of the portion of the signal waveform.

5. The method as recited in claim 1, wherein the position of at least one of the plurality of alert parameter user interface elements relative to the displayed portion of the signal waveform in the alert definition GUI specifies a state change of the signal waveform at which the signal waveform returns to normal after the alert condition has been raised, the method further comprising displaying an auto-reset user interface element, wherein the auto-reset user interface element is configured to toggle between automatically resetting the alert condition when the signal waveform returns to normal and latching the alert condition when the signal waveform returns to normal in response to user input.

6. The method as recited in claim 1, wherein the plurality of alert parameter control user interface elements include one or more of dials, handles, sliders, buttons, and numeric entry boxes.

7. The method as recited in claim 1, further comprising displaying a GUI configuration user interface element the alert definition GUI, wherein the GUI configuration user interface element is configured to receive user input to add or remove alert parameter control user interface elements or alert parameter user interface elements to the alert definition GUI.

8. The method as recited in claim 7, wherein the GUI configuration user interface element is a popup menu.

9. The method as recited in claim 1,
wherein the alert definition is associated with one or more response actions for the alert condition specified by the alert definition in a policy definition on the policy-based automation system;
the policy-based automation system monitoring the corresponding metric for the monitored object;
the policy-based automation system detecting an occurrence of the alert condition in the monitored metric as specified by the alert definition; and
the policy-based automation system performing the one or more response actions in response to said detecting an occurrence of the alert condition.

10. A system, comprising:
a processor;
a display device configured to couple to the processor;
a cursor control device configured to couple to the processor; and
a memory comprising program instructions, wherein the program instructions are executable by the processor to implement an alert definition mechanism configured to:
pictorially display on the display device a portion of a signal waveform including one or more impulses for which the alert condition is to be defined, wherein the portion of the signal waveform is displayed on a graph in an alert definition graphical user interface (GUI) on the display device, wherein the signal waveform corresponds to a metric for an object monitored by a policy-based automation system, wherein the policy-based automation system is a computing environment management system;
display a plurality of alert parameter user interface elements with the portion of the signal waveform displayed on the graph in the alert definition GUI, wherein each alert parameter user interface element represents a different one of a plurality of alert parameters for the signal waveform, wherein a position of each alert parameter user interface element relative to the displayed portion of the signal waveform in the alert definition GUI corresponds to a particular value for the respective alert parameter, and wherein the position of at least one of the plurality of alert parameter user interface elements relative to the displayed portion of the signal waveform in the alert definition GUI specifies a state change of the signal waveform at which the alert condition is raised to alert the policy-based automation system that the metric for the object monitored by the policy-based automation system indicates a condition of the object to which the policy-based automation system is to respond;
display a plurality of alert parameter control user interface elements in the alert definition GUI, wherein each of the plurality of alert parameter control user interface elements corresponds to a different one of the plurality of alert parameter user interface elements, wherein each of the plurality of alert parameter control user interface elements is configured to receive user input to manipulate the position of a corresponding one of the plurality of alert parameter user interface elements relative to the displayed portion of the signal waveform in the alert definition GUI;
receive user input via the cursor control device to at least one of the plurality of alert parameter control user interface elements to manipulate the positions of corresponding ones of the plurality of alert parameter user interface elements relative to the displayed portion of the signal waveform in the alert definition GUI, wherein manipulating the position of an alert parameter user interface element causes a corresponding change in the value of the associated alert parameter; and
generate an alert definition for the policy-based automation system that specifies the alert condition from the values of the plurality of alert parameters associated with the plurality of alert parameter user interface elements.

11. The system as recited in claim 10, wherein the alert definition mechanism is further configured to:
display one or more signal waveform control user interface elements in the alert definition GUI, wherein each of the one or more signal waveform control user interface elements is configured to receive user input to manipulate the displayed portion of the signal waveform in the alert definition GUI; and
receive additional user input via the cursor control device to at least one of the signal waveform control user interface elements to manipulate the displayed portion of the signal waveform in the alert definition GUI prior to said generating an alert definition from the values of the plurality of alert parameters associated with the plurality of alert parameter user interface elements.

12. The system as recited in claim 10, wherein the policy-based automation system is a Storage Area Network (SAN) management system.

13. The system as recited in claim 10, wherein the plurality of alert parameters include one or more of thresholds, rates, and periods for the one or more impulses of the portion of the signal waveform.

14. The system as recited in claim 10, wherein the plurality of alert parameter control user interface elements include one or more of dials, handles, sliders, buttons, and numeric entry boxes.

15. The system as recited in claim 10, wherein the alert definition is associated with one or more response actions for the alert condition in a policy definition on the policy-based automation system.

16. A computer readable storage medium storing program instructions, wherein the program instructions are computer-executable to implement an alert definition mechanism configured to:
pictorially display on a display device a portion of a signal waveform including one or more impulses for which the alert condition is to be defined, wherein the portion of the signal waveform is displayed on a graph in an alert definition graphical user interface (GUI) on the display device, wherein the signal waveform corresponds to a metric for an object monitored by a policy-based automation system, wherein the policy-based automation system is a computing environment management system;

display a plurality of alert parameter user interface elements with the portion of the signal waveform displayed on the graph in the alert definition GUI, wherein each alert parameter user interface element represents a different one of a plurality of alert parameters for the signal waveform, wherein a position of each alert parameter user interface element relative to the displayed portion of the signal waveform in the alert definition GUI corresponds to a particular value for the respective alert parameter, and wherein the position of at least one of the plurality of alert parameter user interface elements relative to the displayed portion of the signal waveform in the alert definition GUI specifies a state change of the signal waveform at which the alert condition is raised to alert the policy-based automation system that the metric for the object monitored by the policy-based automation system indicates a condition of the object to which the policy-based automation system is to respond;

display a plurality of alert parameter control user interface elements in the alert definition GUI, wherein each of the plurality of alert parameter control user interface elements corresponds to a different one of the plurality of alert parameter user interface elements, wherein each of the plurality of alert parameter control user interface elements is configured to receive user input to manipulate the position of a corresponding one of the plurality of alert parameter user interface elements relative to the displayed portion of the signal waveform in the alert definition GUI;

receive user input to at least one of the plurality of alert parameter control user interface elements to manipulate the positions of corresponding ones of the plurality of alert parameter user interface elements relative to the displayed portion of the signal waveform in the alert definition GUI, wherein manipulating the position of an alert parameter user interface element causes a corresponding change in the value of the associated alert parameter; and generate an alert definition for the policy-based automation system that specifies the alert condition from the values of the plurality of alert parameters associated with the plurality of alert parameter user interface elements.

17. The computer readable storage medium as recited in claim 16, wherein the alert definition mechanism is further configured to— display one or more signal waveform control user interface elements in the alert definition GUI, wherein each of the one or more signal waveform control user interface elements is configured to receive user input to manipulate the displayed portion of the signal waveform in the alert definition GUI; and receive additional user input to at least one of the signal waveform control user interface elements to manipulate the displayed portion of the signal waveform in the alert definition GUI prior to said generating an alert definition from the values of the plurality of alert parameters associated with the plurality of alert parameter user interface elements.

18. The computer readable storage medium as recited in claim 16, wherein the policy-based automation system is a Storage Area Network (SAN) management system.

19. The computer readable storage medium as recited in claim 16, wherein the plurality of alert parameters include one or more of thresholds, rates, and periods for the one or more impulses of the portion of the signal waveform, and wherein the plurality of alert parameter control user interface elements include one or more of dials, handles, sliders, buttons, and numeric entry boxes.

20. The computer readable storage medium as recited in claim 16, wherein the alert definition is associated with one or more response actions for the alert condition in a policy definition on the policy-based automation system.

* * * * *

UNITED STATES PATENT AND TRADEMARK OFFICE
CERTIFICATE OF CORRECTION

| | | |
|---|---|---|
| PATENT NO. | : 7,664,849 B1 | Page 1 of 1 |
| APPLICATION NO. | : 11/180886 | |
| DATED | : February 16, 2010 | |
| INVENTOR(S) | : Chandler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Seventh Day of December, 2010

David J. Kappos
*Director of the United States Patent and Trademark Office*